UNITED STATES PATENT OFFICE.

FRANCIS W. COLBY, OF STREATOR, ILLINOIS, ASSIGNOR OF ONE-HALF HIS RIGHT TO KEVER CLYMER, OF SAME PLACE.

IMPROVEMENT IN COMPOUNDS FOR HARDENING LIME AND CEMENT MORTARS.

Specification forming part of Letters Patent No. 158,036, dated December 22, 1874; application filed November 21, 1874.

*To all whom it may concern:*

Be it known that I, FRANCIS W. COLBY, of Streator, county of La Salle and State of Illinois, have invented a new and useful Improvement in Compounds for Hardening and Tempering Lime and Cement Mortars, of which the following is a specification:

The object of the present invention is to provide means for hardening and increasing the strength of lime and cement mortar. The nature of the invention consists in the combination of nitrate of potash or soda and saccharine substance with the cement or mortar, and nitrate of potash and saccharine substance and hyposulphite of soda and alum, mixed with mortar or cement, as hereinafter set forth in detail.

To make six gallons of my compound No. 1, to one gallon of water add two pounds of nitrate of potash and two pounds of sugar or molasses, and heat gently until the nitric vapor ceases, and oxalic acid is formed; then add five gallons of water, and the compound is ready for use. For cements, I use enough of this solution to bring it to a proper consistancy for use. For lime mortars I use enough of the solution to temper them.

To make my compound No. 2, I take the above compound, as described under the head of No. 1, and add to it one pound of hyposulphite of soda, one pound of alum, and three pounds of silicate of soda, and add four gallons of water. Sulphate of copper I consider the equivalent of alum. I use this compound the same as No. 1. It makes, however, a very much stronger cement. The proportions may be varied, and the amount of the compound used lessened or increased, and yet make mortar and cement very strong; but I prefer to make and use it in the manner described and set forth.

I claim and desire to secure by Letters Patent of the United States—

1. The combination of nitrate of potash or soda, saccharine substance with lime, mortar, and cement, as and for the purpose specified.

2. The combination of nitrate of potash, saccharine substance, hyposulphite of soda, alum, and silicate of soda, as and for the purpose described.

FRANCIS W. COLBY.

Witnesses:
JOHN H. ELLIOTT,
G. L. CHAPIN.